(No Model.)
S. J. McDOWELL.
PORTABLE OVEN.
No. 275,784. Patented Apr. 10, 1883.
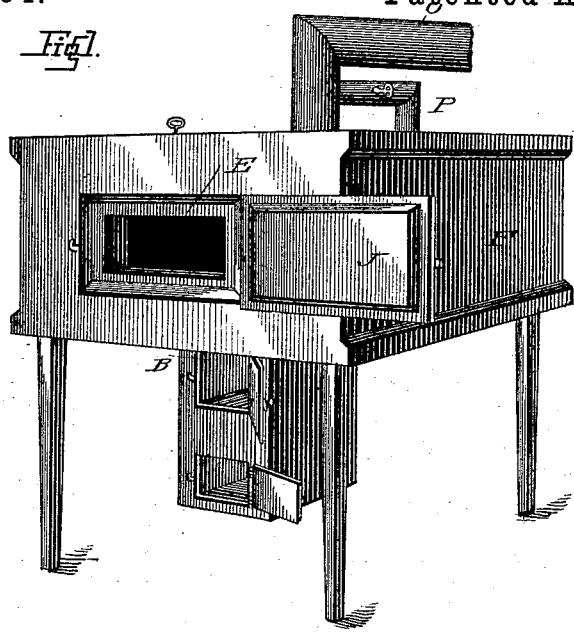
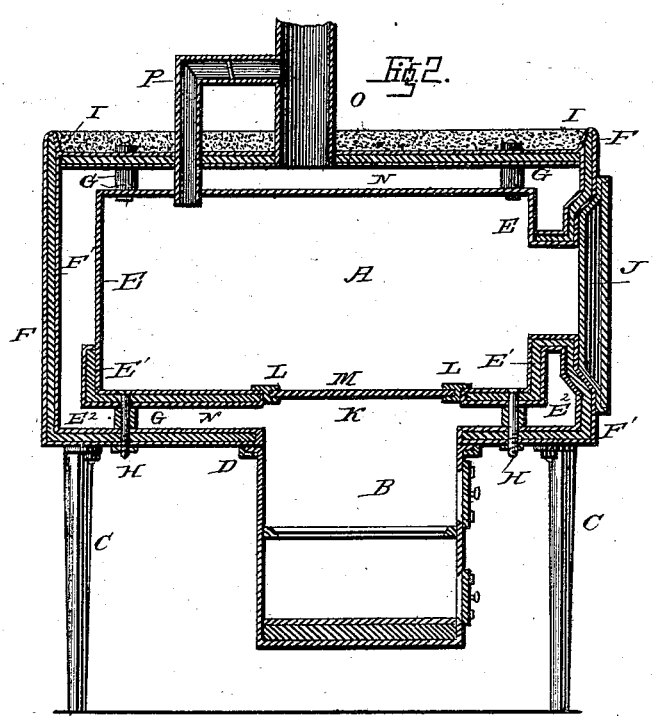
WITNESSES:
INVENTOR.
Samuel J. McDowell,
By Louis Bagger & Co.,
ATTORNEYS.

UNITED STATES PATENT OFFICE.

SAMUEL J. McDOWELL, OF BOSTON, MASSACHUSETTS, ASSIGNOR OF ONE-HALF TO JOSIAH KNIGHT, OF SAME PLACE.

PORTABLE OVEN.

SPECIFICATION forming part of Letters Patent No. 275,784, dated April 10, 1883.

Application filed December 16, 1882. (No model.)

*To all whom it may concern:*

Be it known that I, SAMUEL J. McDOWELL, of Boston, in the county of Suffolk and State of Massachusetts, have invented certain new and useful Improvements in Portable Ovens; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved portable oven, and Fig. 2 is a longitudinal sectional view of the same.

Similar letters of reference indicate corresponding parts in both the figures.

My invention has relation to portable ovens; and it consists in the improved construction and combination of parts of the same, as hereinafter more fully described and claimed.

In the accompanying drawings, the letter A indicates the oven, and B the furnace. The oven is mounted upon detachable legs C, and the furnace, the upper edges of which are flanged, is supported by slides D in the bottom of the oven. The oven consists of an inner casing, E, and an outer casing, F, which are kept at a certain distance from each other by sleeves G, through which pass nutted bolts H, also passing through the casings. The outer casing consists of double sheet metal, with a layer of asbestus, F', interposed, which prevents the heat from radiating, and also renders the oven more durable. The top of the oven is recessed, as shown at I, for the reception of a layer of sand, which likewise prevents radiation of the heat.

J is a door, through which ingress may be had to the interior of the oven, and the inner and outer casing are connected around the opening.

The inner casing, E, consists of a sheet-metal shell, the bottom and lower parts of the sides of which are covered by a layer of asbestus, E', and an outer shell of sheet metal, E².

In the bottom of the outer casing, where the furnace is suspended, is an opening, through which the fire is admitted into the oven, while a corresponding opening in the inner casing is tightly covered by a plate, K, composed of a metallic frame, L, bolted to the inner casing, and holding a plate, M, of soapstone or firebrick. This plate is placed at the point where the flame strikes the inner casing directly, as the heat and immediate exposure would burn and destroy a sheet-metal plate, while it takes slower and less effect upon a stone plate.

The smoke and fire pass around the entire inner casing in the space N, between the inner and outer casing, and are carried away at the top through a pipe, O.

A small pipe, P, provided with a damper, serves to carry all smell of cooking or baking out of the oven into the chimney, when desired, and to decrease the heat in the oven.

It will be seen that by the oven having the outer asbestus lining and the sand-bed on top, very little heat can escape by radiation, and that the heat will circulate evenly around the oven, the lower part of the oven being protected from the too severe heat by the asbestus layer E' and the fire-plate K, so that there will be no danger of articles placed in the bottom of the oven being burned.

Having thus described my invention, I claim and desire to secure by Letters Patent of the United States—

The portable oven consisting of the outer asbestus-lined casing, F, inner casing, E, having protecting-shells E' E², fire-plate K, door J, removable furnace B, suspended in slides D, detachable legs C, pipe O, and smaller pipe P, all constructed and combined substantially as and for the purpose shown and set forth.

In testimony that I claim the foregoing as my own I have hereunto affixed my signature in presence of two witnesses.

SAML. J. McDOWELL.

Witnesses:
WADE H. ADAIR,
MOTTE P. VINCENT.